United States Patent
Chapuis

(10) Patent No.: US 7,493,504 B2
(45) Date of Patent: Feb. 17, 2009

(54) SYSTEM AND METHOD FOR INTERLEAVING POINT-OF-LOAD REGULATORS

(75) Inventor: Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

(21) Appl. No.: 11/927,682

(22) Filed: Oct. 30, 2007

(65) Prior Publication Data

US 2008/0048625 A1 Feb. 28, 2008

Related U.S. Application Data

(63) Continuation of application No. 10/328,154, filed on Dec. 23, 2002, now Pat. No. 7,373,527.

(51) Int. Cl.
*G06F 1/00* (2006.01)
*G05F 1/577* (2006.01)
*G05F 1/00* (2006.01)

(52) U.S. Cl. ............... 713/300; 323/272; 323/282

(58) Field of Classification Search ........... 713/300
See application file for complete search history.

(56) References Cited

U.S. PATENT DOCUMENTS

| | | | |
|---|---|---|---|
| 3,660,672 A | 5/1972 | Berger et al. | |
| 4,194,147 A | 3/1980 | Payne et al. | |
| 4,204,249 A | 5/1980 | Dye et al. | |
| 4,328,429 A | 5/1982 | Kublick et al. | |
| 4,335,445 A | 6/1982 | Nercessian | |
| 4,350,943 A | 9/1982 | Pritchard | |
| 4,451,773 A | 5/1984 | Papathomas et al. | |
| 4,538,073 A | 8/1985 | Freige et al. | |

(Continued)

FOREIGN PATENT DOCUMENTS

CN 2521825 11/2002

(Continued)

OTHER PUBLICATIONS

Microturbine Power Conversion Technology Review, Staunton et al.; Oak Ridge National Laboratory Technical Report; Apr. 8, 2003; 40 pages.
Microcomputer Control of DC/DC Converters for Photovoltaic Applications, Peracaula et al.; Dept. of Electronics Engineering, Industrial Electronics Group—Technical University of Catalonia, Spain; 1991; 4 pgs.
-48V Programmable Hot Swap Sequencing Power Controller, Summit Microelectronics, Inc., Oct. 30, 2002, SMH4804, 41 Pages.

(Continued)

*Primary Examiner*—Suresh K Suryawanshi
(74) *Attorney, Agent, or Firm*—O 'Melveny & Myers LLP

(57) ABSTRACT

A system and method for providing interleaving point-of-load (POL) regulators such that each regulator's switching cycle is phase displaced with respect to those of other POL regulators in the array is disclosed. As a result, the aggregate input and/or output reflected ripple and noise of the input, output, or both is reduced. Each regulator in the array is associated with an unique address. A serial data-line writes the phase spacing programmed to each addressable POL regulator in the array. The present invention permits phase displacement of POL regulators without limitation to the input and output voltages of each of the regulators in the array. The array of POL regulators may also operate in a phase displaced mode with only a single control line. The need for separate controllers and multiple control lines is thereby eliminated.

7 Claims, 7 Drawing Sheets

U.S. PATENT DOCUMENTS

| | | |
|---|---|---|
| 4,538,101 A | 8/1985 | Shimpo et al. |
| 4,607,330 A | 8/1986 | McMurray et al. |
| 4,616,142 A | 10/1986 | Upadhyay et al. |
| 4,622,627 A | 11/1986 | Rodriguez et al. |
| 4,630,187 A | 12/1986 | Henze |
| 4,654,769 A | 3/1987 | Middlebrook |
| 4,677,566 A | 6/1987 | Whittaker et al. |
| 4,761,725 A | 8/1988 | Henze |
| 4,940,930 A | 7/1990 | Detweiler |
| 4,988,942 A | 1/1991 | Ekstrand |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,168,208 A | 12/1992 | Schultz et al. |
| 5,229,699 A | 7/1993 | Chu et al. |
| 5,270,904 A | 12/1993 | Gulczynski |
| 5,272,614 A | 12/1993 | Brunk et al. |
| 5,287,055 A | 2/1994 | Cini et al. |
| 5,349,523 A | 9/1994 | Inou et al. |
| 5,377,090 A | 12/1994 | Steigerwald |
| 5,398,029 A | 3/1995 | Toyama et al. |
| 5,426,425 A | 6/1995 | Conrad et al. |
| 5,481,140 A | 1/1996 | Maruyama et al. |
| 5,489,904 A | 2/1996 | Hadidi |
| 5,532,577 A | 7/1996 | Doluca |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawn |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,005,377 A | 12/1999 | Chen et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,111,396 A | 8/2000 | Line et al. |
| 6,115,441 A | 9/2000 | Douglass et al. |
| 6,121,760 A | 9/2000 | Marshall et al. |
| 6,136,143 A | 10/2000 | Winter et al. |
| 6,137,280 A | 10/2000 | Ackermann |
| 6,150,803 A | 11/2000 | Varga |
| 6,157,093 A | 12/2000 | Giannopoulos et al. |
| 6,157,182 A | 12/2000 | Tanaka et al. |
| 6,163,143 A | 12/2000 | Shimamori |
| 6,163,178 A | 12/2000 | Stark et al. |
| 6,170,062 B1 | 1/2001 | Henrie |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,246,219 B1 | 6/2001 | Lynch et al. |
| 6,249,111 B1 | 6/2001 | Nguyen |
| 6,262,900 B1 | 7/2001 | Suntio |
| 6,288,595 B1 | 9/2001 | Hirakata et al. |
| 6,291,975 B1 | 9/2001 | Snodgrass |
| 6,294,954 B1 | 9/2001 | Melanson |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burstein et al. |
| 6,355,990 B1 | 3/2002 | Mitchell |
| 6,366,069 B1 | 4/2002 | Nguyen et al. |
| 6,373,334 B1 | 4/2002 | Melanson |
| 6,385,024 B1 | 5/2002 | Olson |
| 6,392,577 B1 | 5/2002 | Swanson et al. |
| 6,396,169 B1 | 5/2002 | Voegli et al. |
| 6,396,250 B1 | 5/2002 | Bridge |
| 6,400,127 B1 | 6/2002 | Giannopoulos |
| 6,411,071 B1 | 6/2002 | Schultz |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,448,746 B1 * | 9/2002 | Carlson ..................... 323/272 |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,621,259 B2 | 9/2003 | Jones et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,778,414 B2 | 8/2004 | Chang et al. |
| 6,788,033 B2 | 9/2004 | Vinciarelli |
| 6,788,035 B2 | 9/2004 | Bassett et al. |
| 6,791,298 B2 | 9/2004 | Shenai et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,825,644 B2 | 11/2004 | Kernahan et al. |
| 6,828,765 B1 | 12/2004 | Schultz et al. |
| 6,829,547 B2 | 12/2004 | Law et al. |
| 6,833,691 B2 | 12/2004 | Chapuis |
| 6,850,046 B2 | 2/2005 | Chapuis |
| 6,850,049 B2 | 2/2005 | Kono |
| 6,850,426 B2 | 2/2005 | Kojori et al. |
| 6,853,169 B2 | 2/2005 | Burstein et al. |
| 6,853,174 B1 | 2/2005 | Inn |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |

| | | | |
|---|---|---|---|
| 6,933,709 B2 | 8/2005 | Chapuis | |
| 6,933,711 B2 | 8/2005 | Sutardja et al. | |
| 6,936,999 B2 | 8/2005 | Chapuis | |
| 6,947,273 B2 | 9/2005 | Bassett et al. | |
| 6,949,916 B2 | 9/2005 | Chapuis | |
| 6,963,190 B2 | 11/2005 | Asanuma et al. | |
| 6,965,220 B2 | 11/2005 | Kernahan et al. | |
| 6,965,502 B2 | 11/2005 | Duffy et al. | |
| 6,975,494 B2 | 12/2005 | Tang et al. | |
| 6,977,492 B2 | 12/2005 | Sutardja et al. | |
| 7,000,125 B2 | 2/2006 | Chapuis et al. | |
| 7,007,176 B2 | 2/2006 | Goodfellow et al. | |
| 7,023,192 B2 | 4/2006 | Sutardja et al. | |
| 7,023,672 B2 | 4/2006 | Goodfellow et al. | |
| 7,049,798 B2 | 5/2006 | Chapuis et al. | |
| 7,068,021 B2 | 6/2006 | Chapuis | |
| 7,080,265 B2 | 7/2006 | Thaker et al. | |
| 7,141,956 B2 | 11/2006 | Chapuis | |
| 7,266,709 B2 | 9/2007 | Chapuis et al. | |
| 2001/0052862 A1 | 12/2001 | Roelofs | |
| 2002/0073347 A1 | 6/2002 | Zafarana et al. | |
| 2002/0075710 A1 | 6/2002 | Lin | |
| 2002/0104031 A1 | 8/2002 | Tomlinson et al. | |
| 2002/0105227 A1 | 8/2002 | Nerone et al. | |
| 2002/0144163 A1 | 10/2002 | Goodfellow et al. | |
| 2003/0006650 A1 | 1/2003 | Tang et al. | |
| 2003/0067404 A1 | 4/2003 | Ruha et al. | |
| 2003/0122429 A1 | 7/2003 | Zhang | |
| 2003/0137912 A1 | 7/2003 | Jeon | |
| 2003/0142513 A1 | 7/2003 | Vinciarelli | |
| 2003/0201761 A1 | 10/2003 | Harris | |
| 2004/0080044 A1 | 4/2004 | Moriyama et al. | |
| 2004/0093533 A1 | 5/2004 | Chapuis et al. | |
| 2004/0123164 A1 | 6/2004 | Chapuis et al. | |
| 2004/0123167 A1 | 6/2004 | Chapuis | |
| 2004/0174147 A1 | 9/2004 | Vinciarelli | |
| 2004/0178780 A1 | 9/2004 | Chapuis | |
| 2004/0189271 A1 | 9/2004 | Hanson et al. | |
| 2004/0201279 A1 | 10/2004 | Templeton | |
| 2004/0225811 A1 | 11/2004 | Fosler | |
| 2004/0246754 A1 | 12/2004 | Chapuis | |
| 2005/0093594 A1 | 5/2005 | Kim et al. | |
| 2005/0117376 A1 | 6/2005 | Wilson | |
| 2005/0146312 A1 | 7/2005 | Kenny et al. | |
| 2005/0200344 A1 | 9/2005 | Chapuis | |
| 2006/0022656 A1 | 2/2006 | Leung et al. | |
| 2006/0149396 A1 | 7/2006 | Templeton | |
| 2006/0174145 A1 | 8/2006 | Chapuis et al. | |
| 2006/0244570 A1 | 11/2006 | Leung et al. | |
| 2006/0250120 A1 | 11/2006 | King | |

FOREIGN PATENT DOCUMENTS

| | | |
|---|---|---|
| EP | 0255258 | 2/1988 |
| EP | 0315366 | 5/1989 |
| EP | 0401562 | 12/1990 |
| EP | 0660487 | 6/1995 |
| EP | 0875994 | 11/1998 |
| EP | 0997825 | 5/2000 |
| GB | 2377094 | 12/2002 |
| JP | 60-244111 | 12/1985 |
| JP | 1185329 | 3/1999 |
| KR | 200284495 | 8/2002 |
| RU | 1814177 | 5/1993 |
| SU | 1359874 | 12/1985 |
| WO | WO93/19415 | 9/1993 |
| WO | WO01/22585 | 3/2001 |
| WO | WO02/31943 | 4/2002 |
| WO | WO02/31951 | 4/2002 |
| WO | WO02/50690 | 6/2002 |
| WO | WO02/063688 | 8/2002 |
| WO | WO 03/030369 | 4/2003 |

OTHER PUBLICATIONS

33702 Microprocessor Power Supply (3.0A), Analog Products MC33702 Fact Sheet; Motorola/Digital dna/Power Management Switchings; Jan. 1, 2003, pp. 1-4.

Accelerator-Control-System Interface for Intelligent Power Supplies, S. Cohen, Los Alamos National Laboratory, Jan. 1, 1992, pp. 183-186.

Advanced Configuration and Power Interface Specification, Intel Corporation, Microsoft Corporation, Toshiba Corp. Feb. 2, 1999, Revision 1.0b, 387 Pages.

Advantages of Microcontrollers in DC-DC Converters, Galaxy Power, Jan. 1, 2003 IBM Symposium, Real Solutions for Distributed Power, 8 Pages.

Agilent E364xA Single Output DC Power Supplies, User's Guide; Agilent Techologies, Part No. E3640-90001, Jan. 1, 2000, 207 pages.

Agilent E3640A—E3649A Programmable dc Power Supplies, Data Sheet; Agilent Technologies, Jan. 1, 2000, 4 pages.

Architecture and IC implementation of a digital VRM controller, Jinwen, Xiao et al, 32nd Annual IEEE Power Electronics Specialists Conference. PESC 2001. Conference Proceedings. Vancouver, Canada, Jun. 17-21, 2001, Annual Power Electronics Specialists Conference, New York, NY: IEEE, US, vol. vol. 1 of 4. Conf. 32, Jun. 17, 2001, pp. 38-47, XP010559121 ISBN: 0-7803-7067-8, figure 7.

Automating the Design of a Generic Modular Power System for the Global Market, Pederson, George, Briggs, Steve; Massey, Paul, Advance Power Raynham Road, Bishops Stortford, Herts.; Jan. 1, 1999, CM23 5PF UK.

Auto Sequence Programming Examples for GPIB-M, Xantrex Technology, Inc., Nov. 27, 2002, 1.0a, 4 pages.

BE510 / BE510S Modules—Bipolar DC Source from 100mV to 20V and from 100nA to 4A, Innovative Test Systems; BE510 Version II, Issue 9, Nov. 12, 2000, 3 Pages.

Be52x Modules—Multi-range bipolar DC sources from 30V to 500V, 90W, Innovative Test Systems; BE52x Version A, Issue 9, Aug. 3, 2001, 3 pages.

Characteristics of Automated Power System Monitoring & Management Platforms, Hawkins, John M.; Telepower Australia Pty Ltd, Jan. 1, 2000, telepower@telepower.com.au, IEEE, Intelec, 5 Pages.

Chemistry-Independent Battery Chargers, Maxim Integrated Products, Dec. 1, 2002, 19-1158, Rev 1, MAX1647/MAX1648, 25 Pages.

Continuing Evolution of Intelligence for Telecommunications Power Plants, The Godby, Jimmy, Apr. 1, 1996, IEEE, 0-7803-3507-4/96, pp. 70-75.

Controlling and Alarming DC Power Plants via the Internet, Cosentino, Anthony P.; Sullivan, Michael C.; Baxter, Richard V. Jr.; Loeck, JonPower Conversion Products, LLC and Pensar Corporation, Jan. 1, 1998, 6 pages.

Current-Fed Multiple-Output Power Conversion, Seamus O'Driscoll; John G. Hayes and Michael G. Egan; Artesyn Technologies; Dept. of Electrical Engineering, University College Cork, Ireland, Dec. 3, 2003, 7 pages.

DALI Manual, DALI AG, Digital Addressable Lighting Interface Activity Group, ZVEI-Division Luminaires, Jan. 1, 2001, pp. 1-62.

Defendant's Artesyn Technologies, Inc.'s Preliminary Invalidity Contentions—(Power-One, Inc. vs. Artesyn Technologies, Inc. et al.), Civil Action No. 2-05-CV-463 (LED), United States District Court for the Eastern Division of Texas; Apr. 26, 2006.

DHP Series DC Power Supplies, IEEE 488.2/RS-232 Options Programming Manual; Sorensen, Division of Elgar Electronics Corporation, Document No. M550005-01 Rev B, Jul. 29, 2002, 32 pages.

Digital Addressable Lighting Interface (DALI): An Emerging Energy-Conserving Lighting Solution, The Ronat, Odile; International Rectifier, Apr. 9, 2002, TPApr. 9, 2002, pp. 1-6.

Digital Multiphase Power from Primarion and Intersil Changing the Landscape of Processor Power, Primarion, Inc., White Paper, Sep. 12, 2002, 6 pages.

Digitally Controlled Power Systems: How Much Intelligence is Needed and Where it Should be, Lock, Tom; RELTEC Corporation, Jan. 1, 1998, IEEE, 4 pages.

Digitally-Controlled SMPS Extends Power System Capabilities, Vinsant, Ron; DiFiore, John; Clarke, Richard, PCIM, Jun. 1, 1994, pp. 30-37.

Digitally Controlled Zero-Voltage-Switched Fullbridge Converter, A Rinne, Karl-Heinz; Theml, Klaus; Duigan, Joseph; McCarthy, Oliver, Power Conversion, Jun. 1, 1994 Proceedings, pp. 317-324.

Distributed Intelligence and Modular Architecture for Next Generation DC Power System, Duguay, Louis; Got, Pierre, Astec Advanced Power Systems, Quebec, Canada; Jan. 1, 2000, 6 pgs.

Distributed Power Hot Swap Controller, Summit Microelectronics, Inc., Mar. 19, 2001, SMH4804; 2050 2.3, 32 pages.

Dual 550kHz Synchronous 2-Phase Switching Regulator Controller, Linear Technology, Jan. 1, 1998, LTC1702, 36 Pages.

Dual Smart Card Interface TDA8020HL, Philips Semiconductors, Integrated Circuits, Data Sheet, Feb. 24, 2001, I2C Bus, TDA8020HL, Objective Specification v4.2 Supersedes data of Jan. 2001 File under Integrated Circuits, ICXX, 22 Pages.

Dual Smart Card Interface TDA8020HL/C2, Christophe Chausset, Philips Semiconductors, May 20, 2003, Application Note, TDA8020HL/C2, AN10232, 28 Pages.

Electronic Products Power Supply Special: Programmable Supplies Use Switch-Mode Topologies, Birman, Paul; Nercessian, Sarkis; Kepco, Inc. Flushing NY; vol. 37, No. 10, Electronic Products, Mar. 1, 1995; The Engineer's Magazine of Product Technology; Power Supply Special; DSO Samples Single Shots at 10 Gsamples/s Speech Recognition On A Single Chip LCD Has Flat-Panel Benefits At CRT Cost Product Update: High-Performance OP AMPS; A Hearst Business Publication; pp. 1, 5, 33-34.

Fieldbus System Engineering Guidelines, Fieldbus Foundation, 2003-2004, pp. 1-94.

High Efficiency, 2-Phase Synchronous Step-Down Switching Regulators, Linear Technology, Jan. 1, 1998, LTC1628/LTC1628-PG, 32 Pages.

High Efficiency Synchronous Step-Down Switching Regulator, Linear Technology, Jan. 1, 1998, LTC1735, 33 Pages.

High-frequency digital controller IC for DC/DC converters, Patella B J et al; APEC 2002. 17th. Annual IEEE Applied Power Electronics Conference and Exposition. Dallas, TX, Mar. 10-14, 2002, Annual Applied Power Electronics Conference, New York, NY : IEEE, US, vol, vol. 2 of 2. Conf. 17, Mar. 10, 2002, pp. 374-380, XP010582947, ISBN: 0-7803-7404-5, p. 375, right-hand column; figure 3.

Highly Programmable Voltage Supply Controller and Supervisory Circuit, Summit Microelectronics, Inc., Jun. 7, 2001, SMS44, Preliminary, 19 Pages.

IEEE Standard Codes, Formats, Protocols, and Common Commands for User with IEEE Std 488.1-1987, IEEE Standard Digital Interface for Programmable Instrumentation, IEEE Std 488.2-1992; IEEE, Jun. 18, 1992, ISBN 1-55937-238-9, 254 pages.

IMPI Intelligent Platform Management Bus Communications Protocol Specification v1.0, Intel, Hewlett-Packard, NEC, Dell, Document Revision 1.0, Nov. 15, 1999, 39 pages.

Implementing a Nationwide Energy Management System, Sjöberg, Stig; Hedberg, Tommy; Selberg, Lars; Wikström, Rober, Jan. 1, 2000.

Infinite Impulse Response, Wikipedia, http://en.wikipedia.org/wiki/IIR, May 2, 2006, pp. 1-4.

In-Situ Transfer Function Analysis, 2006 Digital Power Forum Presentaiton; Mark Hagen, Texas Instruments Digital Power Group, Jul. 1, 2006.

Installation Guide MPS Mainframe Model 66000A, Agilent Technologies, Agilent Part No. 66000-90001, 1991-Apr. 2000, 26 pages.

In-System Network Analyzer, 2006 Digital Power Forum Prensentaiton, Silicon Laboratories, Jul. 1, 2006.

Integrate Internet Solutions Into Your Energy Management Network, Sarkinen, Johan; Lundin, Ola; Jun. 1, 1998, 7 pages.

Integrity-One: Installation, Operation and Maintenance Manual, Power-One, Inc., 1999-2003 Version 1.2 (P025374-P025559).

Integrity-One Power System—Rack System, Data Sheet, Power-One, Inc., Nov. 1, 2002, (P025580-P025583).

Intelligent, Fault Tolerant, High Power, Distributed Power System for Massively Parallel Processing Computers, An, Burns, J.; Riel, J.; DiBene, T., IEEE, May 1, 1994, 0-7803-1456-5/94, pp. 795-798.

Intelligent Platform Management Interface Specification v1.5, Intel, Hewlett-Packard, NEC, Dell, Document Revision 1.1, Feb. 20, 2002, 459 pages.

Intelligent Power Supply Controller, Rumrill, R.S.; Reinagel, D.J.; IEEE, Aug. 1, 1991, 0-7803-0135-8/91, PAC 1991, pp. 1537-1539.

KEKB Power Supply Interface Controller Module, Akiyama, Nakamura, Yoshida, Kubo, Yamamoto, Katoh; High Energy Accelerator Research Organization, 1-1 Ohio, Tsukuba 305, Japan; International Conference on Accelator and Large Experimental Physics and Control Systems, Jan. 1, 1997, Beijing, China 4 pgs.

Low Voltage Study Workshop Report, Charles E. Mullett; Lou Pechi; PSMA, Power Sources Manufacturers Association, The Multinational Power Electronics Association, Jan. 1, 2001, 150 Pages.

Magnet Power Supply Control System in KEKB Accelerators, Akiyama, Katoh, Kubo, Yamamoto, Yoshida; KEK, Tsukuba, Japan; International Conference on Accelerator and Large Experimental Physics and Control Systems, Jan. 1, 1999, Triest, Italy pp. 406-408.

Magnet Power Supply as a Network Object, Cohen, S.; Stuewe, R.; IEEE, Aug. 1, 1991, 0-7803-0135-8/91, PAC 1991, pp. 929-931.

Market Trends Toward Enhanced Control of Electronic Power Systems, Miles, F.M.; Danak, R.K.; Wilson, T.G.; Suranyi, G.G.; IEEE, Jan. 1, 1993, 0-7803-0982-0/93, pp. 92-98.

Memorandum Opinion and Order, *Power One v Artesyn Technologies, Inc.*; Civil Action 2:05cv463, Mar. 22, 2007.

Microchip AN811, The RS-232/DALI Bridge Interface, Microchip Technology Inc., Jan. 1, 2002, DS00811A, pp. 1-8.

Microchip AN809, Digitally Addressable DALI Dimming Ballast, Microchip Technology Inc., Jan. 1, 2002, DS00809B, pp. 1-18.

Microchip AN703, Using the MCP320X 12-Bit Serial A/D Converter with Microchip PICmicro® Devices, Microchip Technology Inc., Jan. 1, 2002, DS00703A, pp. 1-25.

Microchp PIC16C781/782 Data Sheet, 8-bit CMOS Microcontrollers with A/D, D/A, OPAMP, Comparators and PSMC Microchip Technology Inc., Jan. 1, 2001, pp. 1-184.

Microprocessor Core Supply Voltage Set by 1 2 C Bus Without VID Lines—Design Note 279, Mark Gurries; Linear Technology—Design Notes, Jan. 7, 2002, 2 Pages.

Motorola Switch Mode Power Supply with Multiple Linear Regulators and High Speed CAN Transceiver, Motorola, Inc. 2002; digital dna; Analog Marketing; Rev. 2.5, Nov. 1, 2002; 33394; Multi-Output Power Supply Semiconductor Technical Data.

NEBS Compliant Board Level Power System, Thomas J. DeLurio, Mikhail Guz and John Ng; Summit Microelectronics, Power One, Oct. 20, 2002, 7 Pages.

New Applications Demand Programmable Power Supplies/Sources, O'Shea, Paul; http://www.evaluationengineering.com/archive/articles/0997powr.htm, Nelson Publishing, Inc., Jan. 1, 1997, 8 pages.

New Digital Power Delivery Architecture, Bob Carroll, Primarion, Sep. 1, 2004, 5 Pages.

Non-Impact Printer Power and Motor Control System on a Chip, Masson, James; Barrow, Steven; IEEE, Apr. 1, 1995, IEEE Catalogue No. 95TH8025, 0-7803-2423-4/95, pp. 98-103.

Operating and Service Manual MQ Series DC Power Supplies, Magna-Power Electronics, Inc., Dec. 19, 2002, 48 pages.

Operating and Service Manual SBC488A, Magna-Power Electronics, Inc., Dec. 19, 2002, 58 pgs.

Operating and Service Manual SQ Series, DC Power Supplies, Magna-Power Electronics, Inc., Dec. 16, 2002, 48 pgs.

Operating Manual for Internal RS-232 Interface for XT 60 Watt and HPD 300 Watt Series Programmable DC Power Supplies, Xantrex Technology, Inc., Jun. 1, 2002, 59 pages.

Operation and Maintenance Process Model for Energy Management, An Lundin, Ola; Ericsson Components AB, Energy Systems Division, Jan. 1, 1999, S-164 81 Kista-Stockholm, Sweden; 7 pages.

Optimizing Power Product Usage to Speed Design Validation Testing, Application Note 1434; Agilent Technologies, Nov. 22, 2002, 16 pages.

PCS Controller, Data Sheet, Power-One, Inc. Nov. 1, 2002 (P025584-P025585).

PCX-150A 150 Amp Pulsed Current Source Operation Manual, Version 3.0, Directed Energy, Inc., Jan. 1, 2001, Document No. 9100-0212 R4, 31 pages.

PMP 25 Rectifier Module, Data Sheet, Power-One, Inc., Undated, (P025602-P025603).
Power Distribution Systems for Future Homes, Lee, Po-Wa; Lee, Yim-Shu; Lin, Bo-Tao; IEEE, Aug. 1, 1999, 0-7803-5769-88/99, pp. 1140-1146.
Power LAN for Telecommunication Power Supply Equipment, A, Vun C.H., Nicholas; C.T., Lau; B.S., Lee; IEEE TENCON '93 Beijing, Jan. 1, 1993, pp. 24-27.
Power Management Solutions for Networking Applications, Darmon, Luc; Smart Networks Developer Forum 2003, Jun. 4-6, 2003, Euro-Disney Paris, France, Motorola digital dna; pp. 1-26; www.motorola.com/sndf.
Power System Controller in an Intelligent Telecom Rectifier Plant, Roth, Ueli; IEEE, Aug. 1, 1992, 0-7803-0779-8/92, pp. 476-483.
Preliminary Information 1.5A Switch-Mode Power Supply with Linear Regulator, 33701; Power Supply Integrated Circuit; Motorola Semiconductor Technical Data; Analog Marketing MC33701/D Rev. 1.0, May 1, 2003; Motorola digital dna; pp. 1-24.
Presenting DALI, AG DALI, Jul. 1, 2003, pp. 1-17.
Programmable Four-Channel Step-Down DC/DC Converter, Texas Instruments, Oct. 1, 2001, TPS54900, 16 Pages.
Programming Guide Series 661xxA MPS Power Modules, Agilent Technologies, Agilent Part No. 5959-3362, 1991-2000, 114 pages.
Programmer Manual, PS2520G & PS2521G Programmable Power Supplies, Tektronix, 070-9197-00, Jan. 1, 1995, 70 pages.
Power Management for Communications: Product Information, Summit Microelectronics, Inc., Jan. 23, 2001, 168 Pages, http://www.summitmicro.com.
Power Management for Communications: Corporate Overview, Summit Microelectronics Inc., Oct. 1, 2002, 213 Pages.
Power Semiconductors and Power Supplies—The Building Blocks of the Digital Power Revolution, Todd Cooper and Holman Harvey; Stephens, Inc. Investment Bankers, Sep. 1, 2000, 132 Pages.
Quad Tracking Power Supply Manager, Summit Microelectronics, Inc., Mar. 4, 2002, SMT4004, 35 Pages.
Quantization Resolution and Limit Cycling in Digitally Controlled PWM Converters, Peterchev, Angel V.; Sanders, A.V.; Electrical Engineering and Computer Science; UC Berkley; Power Electronics Specialists Conference, 2001.PESC, vol. 2, Jun. 17-21, 2001; pp. 465-471; XP002274573.
R. Option, S Option DC Power Supplies, IEEE 488.2/RS-232 Programming Manual; Power Ten, Document No. M550013-01 Rev. C, Jun. 25, 2002, 56 pages.
SCPI Programming Examples for GPIB-M, Xantrex Technology, Inc., Nov. 26, 2002, 1.0, 3 pages.
Service Guide for Agilent 6610xA Power Modules, Agilent Technologies, Agilent Part No. 5959-3364, Dec. 1, 2002, 101 pages.
Silicon Labs Preliminary Invalidity Contentions, Civil Action No. 2-05-CV-463 (LED)—May 26, 2006 (U.S. District Court Eastern District of Texas).
Simple digital hardware to control a PFC converter, A , Zumel P et al; IECON'01. Proceedings of the 27th. Annual Conference of the IEEE Industrial Electronics Society. Denver, CO, Nov. 29-Dec. 2, 2001, Annual Conference of the IEEE Industrial Electronics Society, New York, NY : IEEE, US, v01. vol. 1 of 3. Conf. 27, Nov. 29, 2001, pp. 943-948, XP010572905 ISBN: 0-7803-7108-9, paragraph [IIIC].
Single-Inductor Multiple-Output Switching Converters, Wing-Hung Ki and Dongsheng Ma; Integrated Power Electronics Laboratory, Department of Electrical and Electronic Engineering, The Hong Kong University of Science and Technology, Clear Water Bay, Hong Kong SAR, China, Jan. 1, 2001, 6 Pages.
Six-Channel Power Supply Supervisor and Cacsade Sequence Controller, Summit Microelectronics, Inc., Jul. 16, 2003, SMS66, Preliminary Information, 26 Pages.
SMBus Controls CPU Voltage Regulators without VID Pins, Mark Gurries, Design Ideas, Linear Technology Magazine, Sep. 1, 2001, 2 Pages.
SMBus VID Voltage Programmers, Linear Technology, Jan. 1, 2001, LTC1699 Series, 20 Pages.
SMH4804, SMP9210 and SMT4004 Telecom Reference Design, Summit Microelectronics, Inc., Sep. 5, 2002, Application Note 25, 17 Pages.

Synchronization of Multiple Voltage Regulator Outputs, Mueller, M.W.; et al., IBM Technical Disclosure Bulletin, Jun. 1, 1999; 2 pages.
System Management Bus (SMBus) Specification Version 2., Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.
System Management Bus Specification, Revision 1.1, Smart Battery System Specifications, Revision 1.1, Dec. 11, 1998; Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG. 39 pgs.
Technical Overview, Foundation™ fieldbus, Freedom to Choose. Power to Integrate, Fieldbus Foundation, Jan. 1, 2003, FD-043 Rev 3.0, pp. 1-37.
Testing Intelligent Power Supplies for the Los Alamos National Laboratory Accelerator Complex, Sturrock, J.C. ; Cohen, S.; Weintraub, B.L.; Hayden, D.J.; Archuletta, S.F.; Los Alamos National Laboratory, Jan. 1, 1992, pp. 217-219.
Uniform Language for Accessing Power Plants—Human-Machine Language, ANSI T1.317-1993; American National Standards Institute, Dec. 14, 1993, 55 pages.
User's Guide Series 661xxA MPS Power Modules & Model 66001A MPS Keyboard, Agilent Technologies, Agilent Part No. 5959-3386, 1992-Apr. 2000, 53 pages.
User Manual, PS2520, PS2520G, PS2521 & PS2521G Programmable Power Supplies, Tektronix, 070-9196-00, Jan. 1, 1995, 56 pages.
vol. 1: Syntax and Style, SCPI Consortium, May 1, 1999, Version 1999.0, 67 pages.
vol. 1: Syntax and Style, Standard Commands for Programmable Instruments (SCPI) Consortium, May 1, 1997, Version 1997.0, 68 pages.
vol. 2: Command Reference, SCPI Consortium, May 1, 1999, Version 1999.0, 565 pages.
vol. 2: Command Reference, SCPI Consortium, May 1, 1997, Version 1997.0, 506 pages.
vol. 3: Data Interchange Format, SCPI Consortium, May 1, 1999, Version 1999.0, 72 pages.
vol. 3: Data Interchange Format, SCPI Consortium, May 1, 1997, Version 1997.0, 73 pages.
vol. 4: Instrument Classes, SCPI Consortium, May 1, 1999, Version 1999.0, 115 pages.
vol. 4: Instrument Classes, SCPI Consortium, May 1, 1997, Version 1997.0, 58 pages.
VXI Bus Programmable DC Power Supplies, Advanced Power Designs, Inc., Irvine, CA; Jan. 1, 1993, 5 pages.
Why have Monitoring?, Shawyer, P.; Hobbs. P.; McLeod, A.; Jan. 1, 2001, 8 Pages.
Wide Operating Range, No Sense Step-Down Controller, Linear Technology, Jan. 1, 2001, LTC1778/LTC1778-1, 24 Pages.
Wide Operating Range, No Sense Step-Down DC-DC Controller with SMBus Programming, Linear Technology, Jan. 1, 2001, LTC1909-8, 34 Pages.
"Automated Power Distribution System Hardware", Anderson et al.; Aug. 6, 1989; pp. 579-584.
"MicroSCADA Technology Rev. 8.4.2 Documentation CD: Application Objects, Chapter 5. Data Objects", CD-ROM; Sep. 18, 1998, ABB, XP002481365; 11 Pages.
"Modern User Interface Revolutionizes Supervisory Systems", D'Armour et al.; IEEE Computer Applications in Power; vol. 7, No. 1; Jan. 1, 1994; pp. 34-39.
"Open Architecture Distributed Processing—The Modern Design for Electric Power Network Automation", Hissey et al.; IEEE Region 9 Colloquium; Sep. 1990; pp. 150-161; XP010038436.

* cited by examiner

SYSTEM AND METHOD FOR INTERLEAVING POINT-OF-LOAD REGULATORS

RELATED APPLICATION DATA

This patent application is a continuation of U.S. patent application Ser. No. 10/328,154, filed Dec. 23, 2002 now U.S. Pat. No. 7,373,527.

BACKGROUND OF THE INVENTION

1. Field of the Invention

The present invention relates generally to power supply circuits and more particularly, to voltage regulator systems for use in power supply systems.

2. Background of the Invention

Multi-phase regulators are commonly used in generating a single output voltage. For conventional multi-phase systems, a common control circuit drives several out-phased power circuits. The power stages typically consist of several chokes connected to a single section of output capacitors. The benefits of the conventional multi-phase design is the reduction of both input reflected ripple currents and output ripple current in the output capacitor resulting from the displaced phasing of the choke currents. In this type of arrangement, the output voltage is normally fed back into the master pulse width modulation (PWM) controller. In turn, the PWM controller compensates the loop and distributes a pulse width modulated signal out-phased to each of the several output power stages over multiple lines.

As discussed above, in comparison to single-phase systems, multi-phase regulators have a low output capacitor ripple and low input reflected ripple current. Unfortunately, conventional multi-phase regulators also have a number of disadvantages. Conventional multi-phase systems are limited to a single common input voltage and a single common output voltage. Because conventional multi-phase systems include a multi-phase PWM controller that controls multiple slave power stages, these systems also require multiple control lines running from the controller to the slave power stages. Moreover, the phase location is fixed and is not adjustable from the master controller.

In view of the foregoing, it is believed that a need exists for an improved multi-phase regulator system that overcomes the aforementioned obstacles and deficiencies of currently-available multi-phase regulator systems. More particularly, a need exists for a flexible multi-phase regulator system for use in power supply circuits.

SUMMARY OF THE INVENTION

The present invention is directed toward a multi-phase regulator system that is configured to provide multiple independent output voltages or currents and programmable phase offsets via a single control line.

The present system and method provides an array of point-of-load (POL) regulators in which the switching cycle of each regulator is displaced with respect to those of other regulators in the array to reduce the aggregate reflected ripple and noise of the input, output, or both. Each regulator in the array is provided with an address. A serial data-line may write the phase spacing to each addressable POL in the array. In an alternative exemplary embodiment, the phase spacing is determined based on the address. Accordingly, the system and method of the present invention provides phase displacement of the regulators without being limited by the input and output voltages of each of the regulators in the array. Moreover, the array may operate in a phase displaced mode with only a single control line and without the need for separate controllers or multiple control lines.

The present system and method further provides for the control of independent single phase regulators. Therefore, because the phase displacement is independent of the input voltage, the system and method may provide multiple independent input voltages within the array. In an alternative exemplary embodiment, the array is capable of being configured as a single output multi-phase system. The array does not require a master controller because the control system is distributed in all regulators. Thus, the above functionality is independent of the regulator topology. Moreover, the array may utilize a single control line, instead of multiple control lines.

The present invention removes the restriction of a common output voltage. In addition, the common input voltage does not restrict the operation of the array. The phasing determination is either made at a system controller or at each of the power stages. Furthermore, the control loops are closed locally at each power stage, rather than centrally. The present invention reduces the system noise generated by the array of POL regulators and thereby reduces the filter requirements to manage such noise by out-phasing the switching of the regulators. A further advantage is that the phase location of the start of each POL switching cycle is programmable and thereby provides flexibility and adjustability. For example, this flexibility in phase location of each regulator can be used to optimize the noise performance of the array. The addressable nature of the regulators provides an additional degree of flexibility for the array.

Other aspects and features of the present invention will become apparent from consideration of the following description taken in conjunction with the accompanying drawings.

Figure 1:
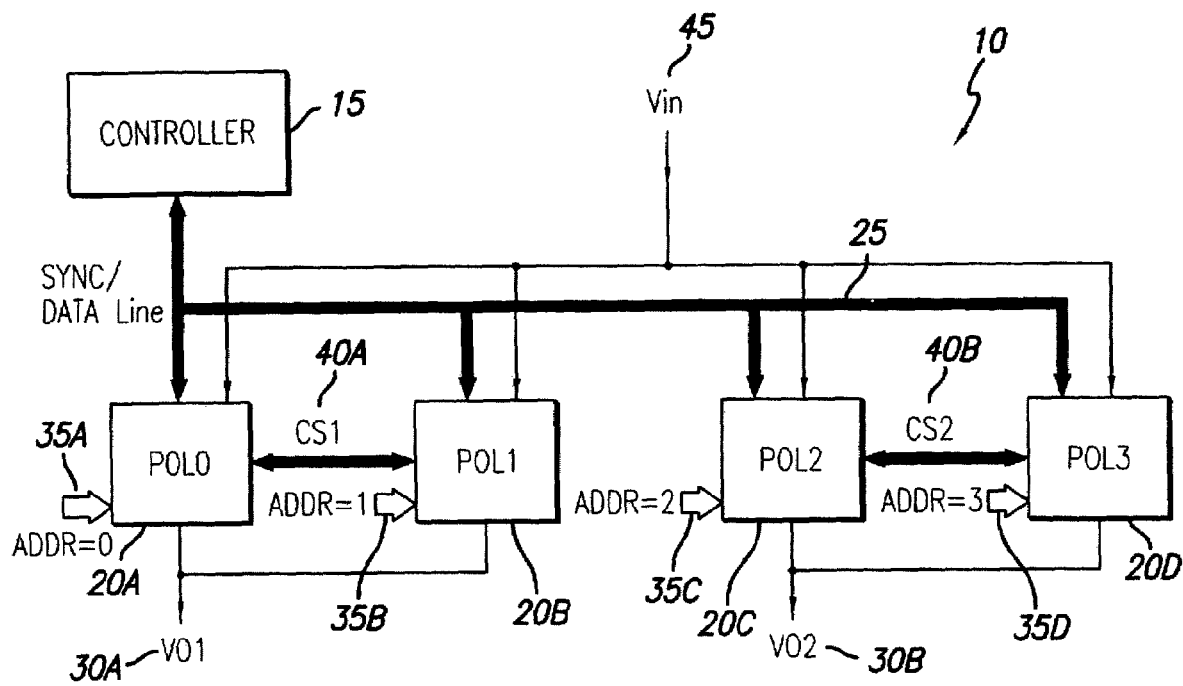
FIG. 1 is an exemplary block diagram of one embodiment of an array of point-of-load (POL) regulators in accordance with the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not describe every aspect of the present invention and do not limit the scope of the invention.

DETAILED DESCRIPTION

The present invention is directed to a system and method for providing interleaving point-of-load (POL) regulators such that each regulator's switching cycle is phase displaced with respect to those of other regulators in the array. As a result, the aggregate reflected ripple and noise of the input, output or both is reduced. Each regulator in the array is associated with an address. A serial data-line may write the phase spacing programmed to each addressable POL regulator in the array. Alternatively, the phase spacing data may be provided from memory. Accordingly, the present invention permits phase displacement of the regulators without limiting the input and output voltages of each of the regulators in the array. The array of regulators may also operate in a phase displaced mode with only a single control line. The need for separate controllers and multiple control lines is thereby eliminated.

FIG. 1 shows an exemplary embodiment of a point-of load (POL) regulator array system of the present invention, shown generally at 10. The system 10 includes an array of POL regulators or converters 20 and a controller 15. POL regulators 20 and controller 15 may be configured to form a board level distributed power architecture, for example. Although the exemplary embodiment depicted in FIG. 1 shows a controller 15, the present invention does not require controller 15, as will be shown and described below with reference to FIG. 2. Controller 15 and POL regulators 20 communicate via interface 25. Interface 25, shown as SYNC/DATA line 25, may be a one line, bi-directional interface.

Each POL regulator 20 is associated with a selected address. The address configuration for each POL regulator 20 specifies an ID for that POL regulator 20. A selected POL regulator 20, shown as POL regulator 20A, may be designated as the Master POL regulator 20. This designation may be based on a selected address, e.g., the least significant address or Address 0. The Master POL regulator 20A generates the SYNC portion of the SYNC/DATA line signal 25. Controller 15 and all other POL regulators 20 synchronize to this SYNC signal. Any other device connected to the SYNC/DATA line 25 may provide the clock, e.g., POL regulator 20, controller 15 or an additional external clock generator (not shown).

The power conversion switching frequency of each POL regulator 20 is synchronized to a (integer or fractional) multiple of the SYNC/DATA line frequency. Therefore, the POL regulators 20 do not have to operate at the same frequency. As a result, this provides greater system flexibility and optimized efficiency because each POL regulator 20 may operate at its optimal frequency depending on its input voltage and output voltage setting instead of operating at the same frequency as every other POL regulator in the system.

Each POL regulator 20 may receive input voltage Vin 45. The output voltage Vo of each POL regulator 20 may be provided to devices connected to system 10 in any suitable manner. In the exemplary embodiment shown in FIG. 1, for example, the output of two or more POL regulators 20 may be connected in parallel. In this embodiment, an additional current share line 40 may be used to ensure an equal load share between the POL regulators 20.

As discussed above, controller 15 and POL regulators 20 communicate via interface 25, e.g., a one line, bidirectional SYNC/DATA line. Controller 15 may transmit data through SYNC/DATA line 25 to each of the POL regulators 25. Controller 15 may set the specific phase displacement for each of the POL regulators 25 through this interface. Controller 15 may set the phase displacements for each POL regulator 25 to minimize the switching noise on the intermediate bus voltage. Alternatively or additionally, controller 15 may set the phase displacements to minimize the noise on the output of the POL regulators 25 connected in parallel. Controller 15 may set the phase displacement statically, e.g., the phase displacement is programmed or set in a permanent or semi-permanent manner. Alternatively, controller 15 may adapt the phase displacement dynamically to minimize the noise in the system when specific system parameters change. These system parameters may include, for example, load currents, output or input voltages or the number of POL regulators (e.g., the phase displacement may be dynamically adapted when POL regulators are added or removed physically or enabled or disabled electrically).

Because of the flexible nature of the present invention, system 10 may be configured in a variety of modes. For example, in one exemplary embodiment, system 10 may include a common input bus with several voltage outputs. In another exemplary embodiment, system 10 may include several input buses and several voltage outputs. In another exemplary embodiment, system 10 may include a common input bus and a single voltage output. In this particular embodiment, the single voltage output may be a multi-phase voltage output.

Figure 2:
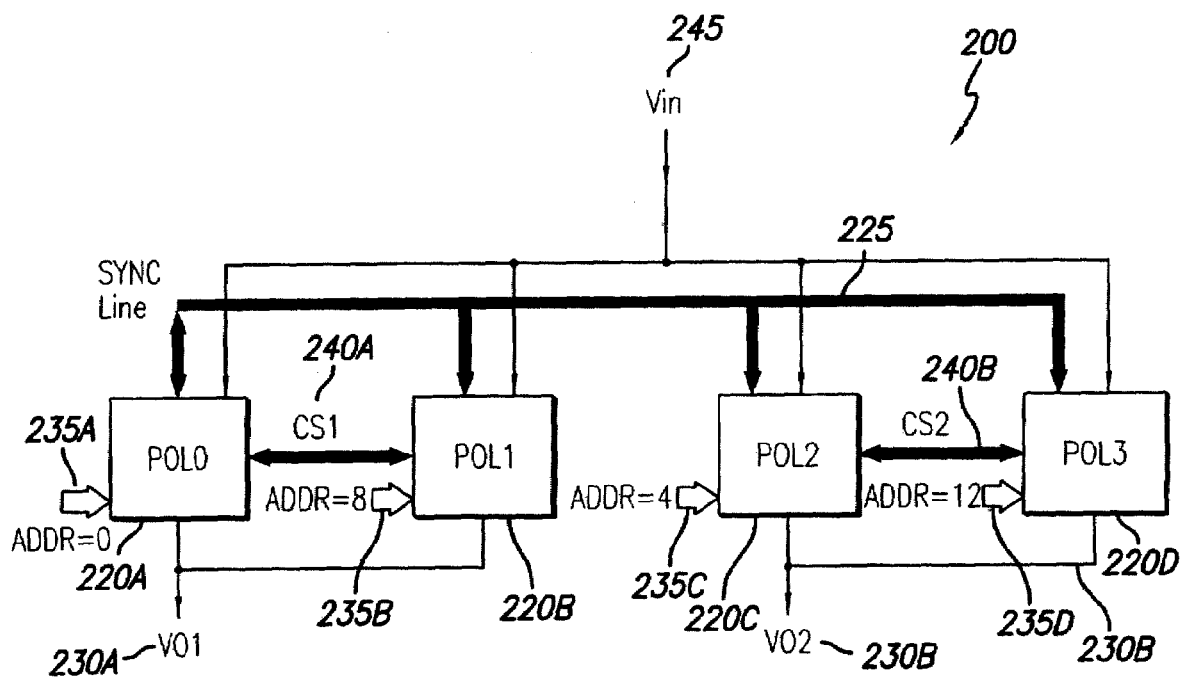
FIG. 2 illustrates another exemplary embodiment of the POL regulator array.

FIG. 2 illustrates another exemplary embodiment of the present invention. The POL regulator array, indicated generally at 200, includes POL regulators 220 and SYNC line 225. The outputs of POL regulators 235A and 235B are connected in parallel to provide output voltage 230 (Vo1). Similarly, the outputs of POL regulators 235C and 235D provide output voltage 230B (Vo2). Current share lines 240A and 240B are provided for these two pairs, respectively, to provide an equal load share. The input voltage 245 (Vin) is provided to each POL regulator 220. In this particular exemplary embodiment, system 200 does not include a controller. A selected POL regulator 235A, e.g., the POL regulator with Address=0, acts as the Master POL regulator and generates the SYNC portion of the SYNC line signal. All other POL regulators 220 synchronize to this signal. Any internal or external device connected to SYNC line 225 may provide the clock.

Data transmission over SYNC line 225 is not necessary to set the phase displacement of POL regulators 235. In this exemplary embodiment, the address of each POL regulator 235 may be used to determine the phase displacement of the POL regulator 235. For example, as discussed below in reference to FIG. 5, the address of the POL regulators 235 may be used to determine the phase displacement of the pulse width modulated (PWM) signals of each POL regulator 235 as compared to the SYNC line 225. For instance, the address of each POL regulator 20 may set the initial phase displacement and this phase displacement can be overwritten or changed by the controller 15. The addresses for the POL regulators 235 do not need to be unique. For instance, POL regulators 235 with the same address will be phase synchronized. Thus, the optimal phase position of each POL regulator 235 may be chosen to minimize a specific design parameter by wiring or programming the address via input 235 accordingly. For example, POL regulator 220A ("POL 0") may have a phase displacement of 0°, POL regulator 220B ("POL 1") may have a phase displacement of 180°, POL regulator 220C ("POL 2") may have a phase displacement of 90° and POL regulator 220D ("POL 3") may have a phase displacement of 270°. In this particular example, the POL regulators connected in parallel, as shown in FIG. 2, will have a 180° phase shift, which is optimal for the outputs of system 200. Similarly, the pairs are 90° phase shifted with respect to each other, which therefore provides an optimal current distribution for the input of system 200.

Figure 3:
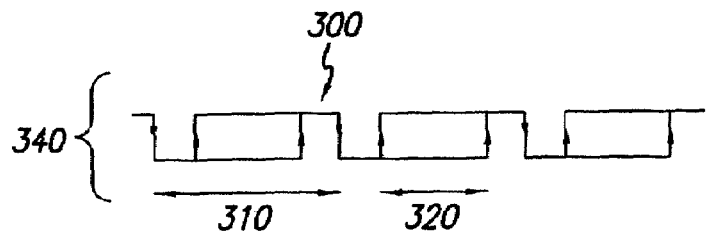
FIG. 3 is an exemplary embodiment of communication over a single-wire bus.

FIG. 3 illustrates one exemplary method of communicating over a single-wire serial bus, e.g., the SYNC/DATA line. Specifically, a transmission line 340 is created by propagating a clock signal 300 over the serial bus. The clock signal 300 can be generated by the controller, a particular POL regulator (e.g., the POL regulator with the least significant address or Address=0), or an external device. The clock signal 300 synchronizes the various communicating devices (e.g., the POL regulators and the controller) and creates a series of clock cycles 310, each one including a data bit 320. This data bit 320 allows the various communicating devices to transmit a single bit of data for every clock cycle 310. Accordingly, each communicating device transmits data by leaving/pulling the data bit 320 high or low (i.e., binary one or zero). It should be appreciated that FIG. 3, as discussed herein, is not intended to limit the present invention, but to provide an example as to how communication can occur over a single-wire serial bus.

Figure 4:
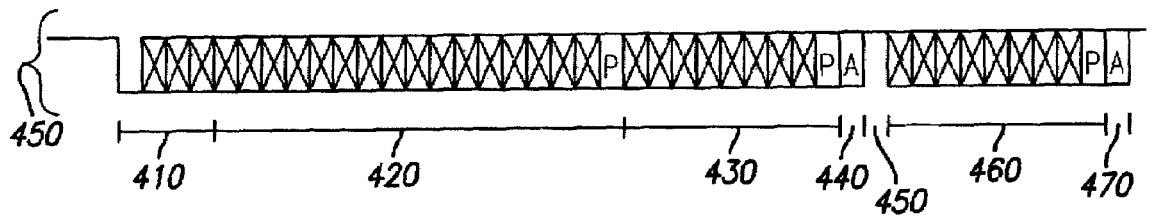
FIG. 4 illustrates an exemplary embodiment of a data transmission scheme utilized by the POL regulators and controller.

FIG. 4 illustrates one exemplary method of transmitting information between the controller and at least one POL regulator. In this particular example, a forty-two bit communication cycle 450 can be used to transmit initial-configuration data, fault-monitoring data, unique ID data or any combination thereof. As shown in FIG. 4, the forty-two bit transmission cycle 450 includes a four bit start sequence 410, a sixteen bit (with parity) address set 420, an eight bit (with parity) command set 430, a first acknowledgement bit 440, an eight bit (with parity) data set 460, and a second acknowledge bit 470. An additional bit 450 has been added to ensure that the command set 430 is executed before the data set 460 is provided. It should be appreciated that the communication cycle 450 depicted in FIG. 4 is not intended to limit the present invention, but to illustrate how information can be transmitted over a serial bus. Therefore, communication cycles containing more or less information or bits are within the spirit and scope of the present invention.

The first and second acknowledgement bits 440 and 470, respectively, are used to acknowledge the reception of the command set 430 and the data set 460, respectively. It should be appreciated that the device responsible for the providing the first and second acknowledgement bits 440 and 470 varies depending upon whether the information is being sent to or from the POL regulator (e.g., whether the information is being written, read, or provided).

The command set 430, data set 460 and address set 420 enable the controller and the POL regulators to write, read and provide data. For example, the command set 430 is used to identify whether and what the controller is writing (e.g., writing to the status register), the controller is reading (e.g., reading the status register), or the POL regulator is providing (e.g., providing status register information). The address set 420 is used to identify the POL regulator(s) that is being written to or read or the POL regulator that is providing information. The data set 460 is used to identify the actual data that is being written, read, or provided.

The start sequence 410 and address set 420 are used, in part, to identify the sender of the information. For example, the controller uses a different start sequence 410 than the POL regulators. Thus, the controller can determine, by reading the start sequence 410 of the communication cycle 450 being transmitted, whether a POL regulator is also attempting to send a communication cycle 450 at the same time. Similarly, each POL regulator has a different address set 420. Thus, a POL regulator can determine, by reading the start sequence 410 and address set 420 of the communication cycle 450 being transmitted, whether another POL regulator or the controller is also attempting to send a communication cycle 450 at the same time. If multiple devices are attempting to send a communication cycle 450, sequencing data is used to allocate or arbitrate bus use. It should be appreciated that the sequence data can either be stored (or hard wired) as a default value or provided as initial-configuration data and stored in the storage device (e.g., a sequencing configuration register).

Figure 5:
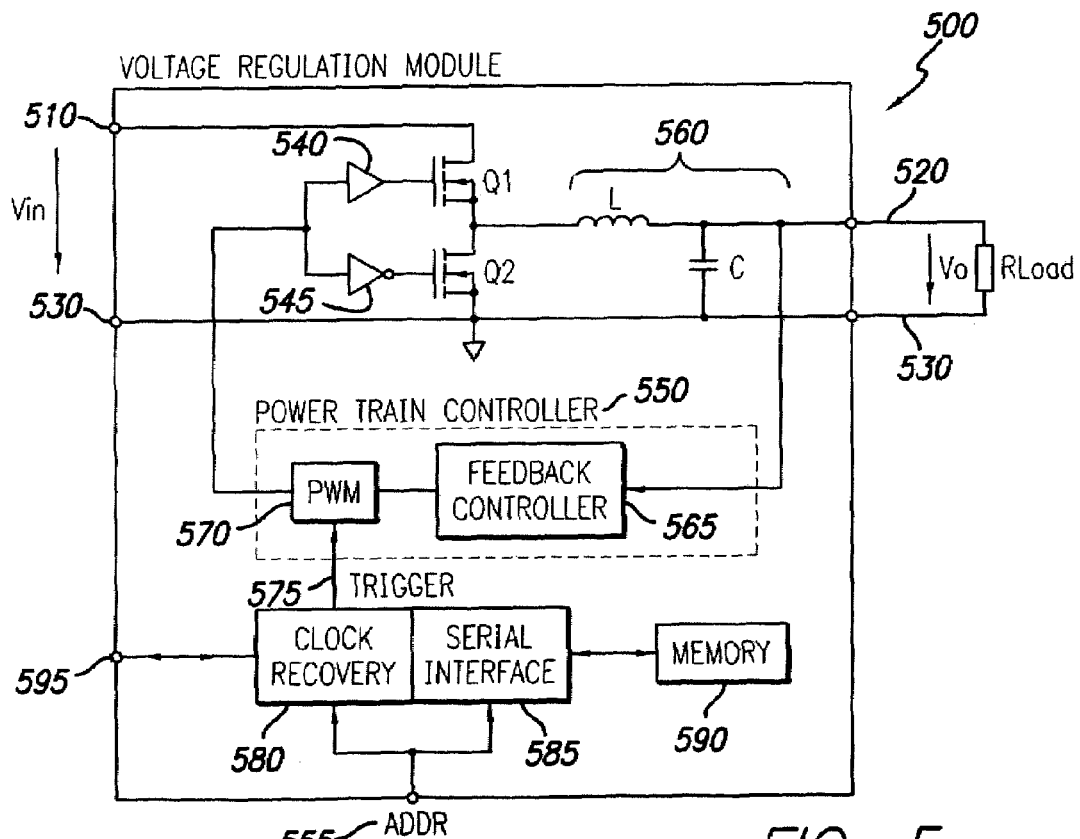
FIG. 5 illustrates an exemplary embodiment of a voltage regulator.

FIG. 5 shows an exemplary embodiment of a voltage regulation module, indicated generally at 500, according to the present invention. The voltage regulation module 500 has an input stage and an output stage accessible via an input terminal 510 and an output terminal 520 with a return terminal 530. Generally, voltage regulation module 500 is designed to convert the input voltage Vin between the terminals 510 and 530 into an output voltage Vo between the terminals 520 and 530. The voltage regulation module 500 includes a L/C low pass filter, indicated generally at 560, driven by switching elements Q1 and Q2. A non-inverting driver 540 and an inverting driver 545 are provided for power switches Q1 and Q2, respectively, and these drivers are both controlled or activated by a pulse width modulated control signal generated by the PWM signal generator or pulse width modulator 570, discussed below.

The voltage regulation module also includes an output voltage or power train controller 550. The output voltage controller 550 includes a feedback controller 565 and pulse width modulator 570 that is synchronized to the TRIGGER signal 575. The module 500 further includes a clock recovery circuit 580, a serial interface handler 585 and a memory block 590. The clock recovery circuit 580 generates the phase shifted, synchronized TRIGGER signal 575. The serial interface handler 585 decodes any messages that are sent over the SYNC/DATA line 595 and stores the data in the memory block 590, e.g. the required phase displacement. The clock recovery circuit 580 and serial interface handler 585 receive address data via input 555. If there is no communication over the SYNC/DATA line 595, for instance, in the case of the exemplary embodiment of the POL regulator array shown in FIG. 2 or before any communication over the SYNC/DATA line 595 has taken place, in the case of the exemplary embodiment shown in FIG. 1, the memory 590 may be initialized with pre-defined data. This data can either be hardwired or programmed by an OTP (one time programmable) method or any other method. As discussed above, the TRIGGER signal 575 is sent to the voltage regulator's pulse width modulator 570 to start a new PWM control signal used to control the drivers 540 and 545 associated with the power switches Q1 and Q2.

Figure 6:
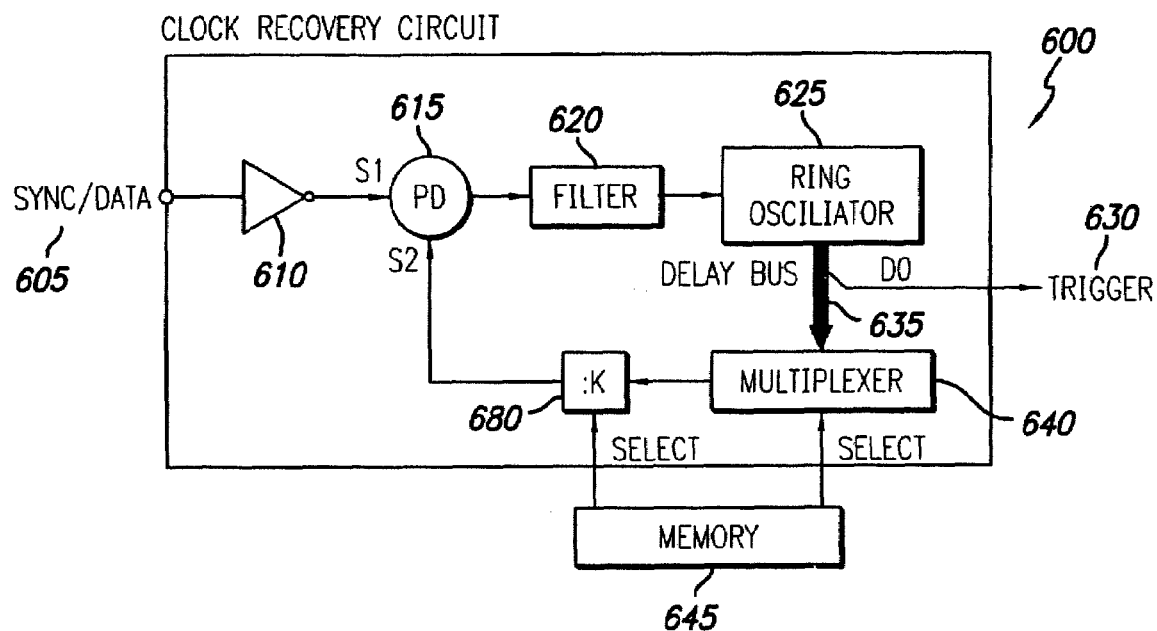
FIG. 6 illustrates an exemplary embodiment of a clock recovery circuit.

FIG. 6 shows an exemplary embodiment of the clock recovery circuit, indicated generally at 600, of the present invention. Generally, clock recovery circuit 600 receives a SYNC/DATA signal 605 and generates a phase-shifted synchronized TRIGGER signal 630. Clock recovery circuit 600 includes an inverter 610, a phase detector (PD) 615, a filter 620, a ring oscillator 625, a delay bus 635, a multiplexer 640 and a frequency divider 680. Clock recovery circuit 600 may access a memory location 645. For example, this memory location may be a memory location in the voltage regulator (e.g., memory 590 as shown in FIG. 5).

Inverter 610 inverts SYNC/DATA line signal 605. Phase detector 615 generates a signal which is proportional to the frequency and phase difference of the positive slopes of signals S1 (generated by the inverter 610) and S2 (generated by the frequency divider 680). Filter 620 filters the phase difference and controls the ring-oscillator frequency and phase. Ring oscillator 625 is an oscillator that may generate a delay bus 635. The signals of delay bus 635 are equally spaced to each other (see FIG. 7, described below). As discussed above, the D0 signal is used as the TRIGGER signal 630 to synchronize the PWM generator of the power train feedback loop (see, for example, FIG. 5). Multiplexer 640 selects, based on the settings in memory block 645, at least one output of delay bus 635. Frequency divider 680 divides the frequency of the output of multiplexer 640 according the settings in memory block 645 and feeds the signal (shown in FIG. 6 as S2) back to phase detector 615.

Generally, the components of clock recovery circuit 600 form a phase locked loop. The phases of the signals S1 and S2 are aligned in steady state. Depending on which signal is chosen by multiplexer 640 from delay bus 635, the D0 positive transition can be shifted relative to the negative transition of the SYNC/DATA line 605. The D0 positive transition defines the starting point of the PWM signal in the power train, e.g., power train 550 shown in FIG. 5. In another exemplary embodiment, a selected voltage regulator 500 may serve as the master voltage regulator. The master voltage regulator includes the master clock generator to generate the synchronization signal, as discussed above. In this case, the clock recovery circuit 600 of the master voltage regulator may be configured to act as the master clock generator. For example, this clock recovery circuit 600 may be configured to serve as the master clock generator by opening the phase locked loop of the clock recovery circuit and using the ring oscillator 625 as a free-running oscillator.

Figure 7:
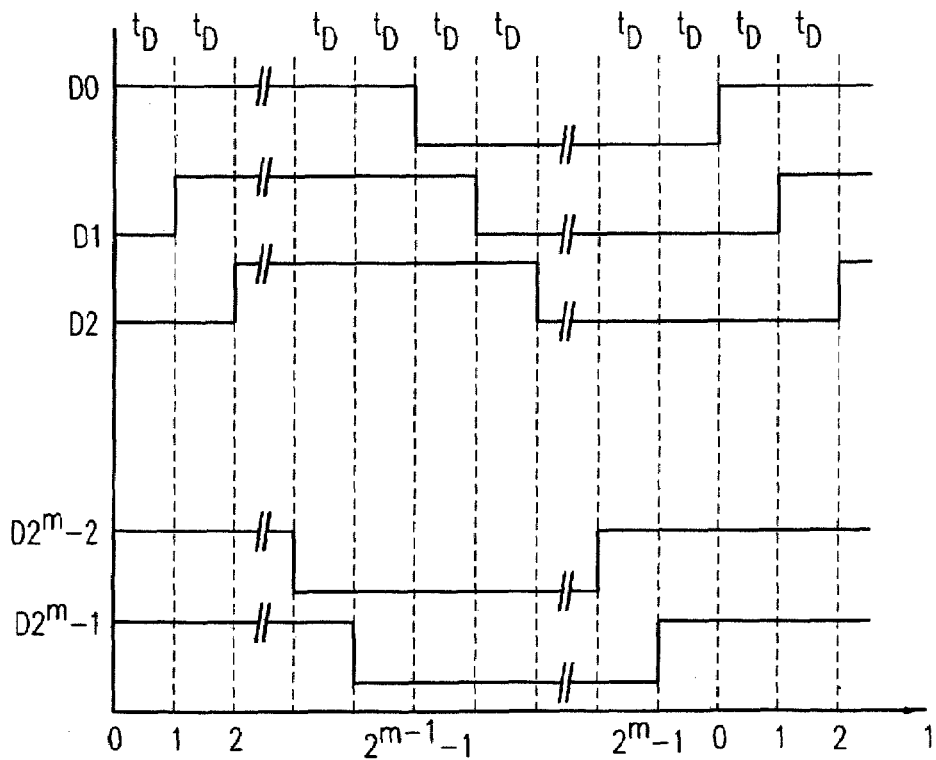
FIG. 7 illustrates an exemplary embodiment of a delay bus.

FIG. 7 shows an exemplary embodiment of the signals generated by the delay bus 635 as shown in FIG. 6. In the exemplary embodiment of FIG. 7, the ring oscillator 625 generates a delay bus consisting of $2^m$ signals, wherein each signal is equally delayed by $t_d$. Note that the delay bus need not generate $2^x$ number of signals. In a system without a controller (e.g., as depicted in the exemplary embodiment of FIG. 2), the phase lead or phase displacement may accordingly be expressed as:

$$Phi=\{[\text{value (address)}]/(\text{maximum number of POL regulators})\}\times 360°$$

The value (address) corresponds to the address of the selected POL regulator or delay bus signal. The denominator corresponds to the maximum number of POL regulators in the system that may be addressed, e.g., 32.

Figure 8:
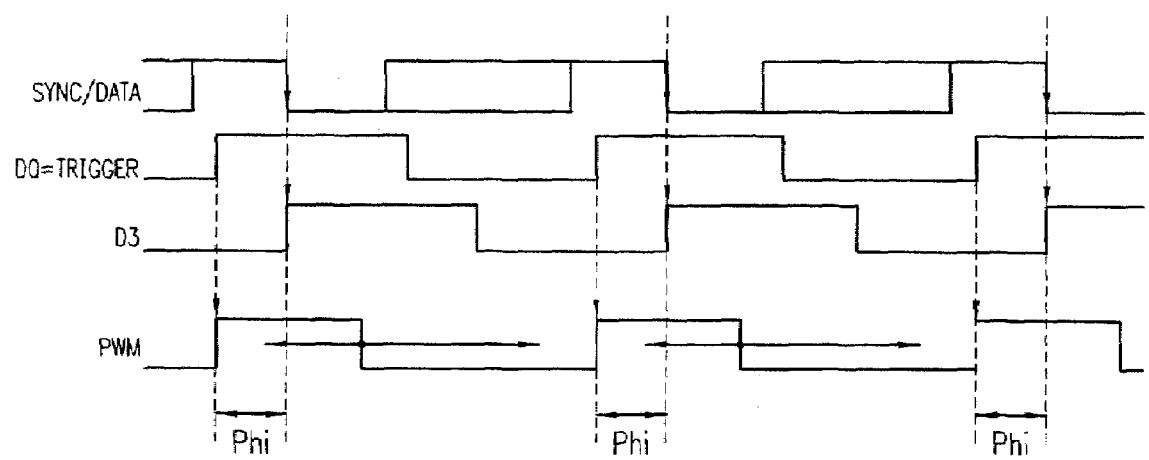
FIG. 8 illustrates an exemplary embodiment of the timing diagram of the clock recovery circuit of FIG. 6.

FIG. 8 shows an exemplary embodiment of the various timing signals of the voltage regulation module and clock recovery circuit of the present invention. In this example, m=4. The multiplexer 640 (shown in FIG. 6) selects signal D3 from delay bus 635. The frequency divider 680 is set to K=1. Accordingly, the clock recovery circuit 600 aligns the selected delay bus signal D3 to the SYNC/DATA line. As a result, using the formula discussed above, the delay bus signal D0 (e.g., the SYNC signal) has a predictable phase lead of $Phi=3/2^m\times 360°=67.5°$ compared to the SYNC/DATA line. The positive slope of the D0 signal (e.g., the TRIGGER signal) triggers the starting of the PWM signal. Therefore, the PWM signal has the same phase lead as the D0 signal. By changing the multiplexer selection, the phase lead of the PWM signal is therefore selectable by the value stored in memory.

Figure 9:
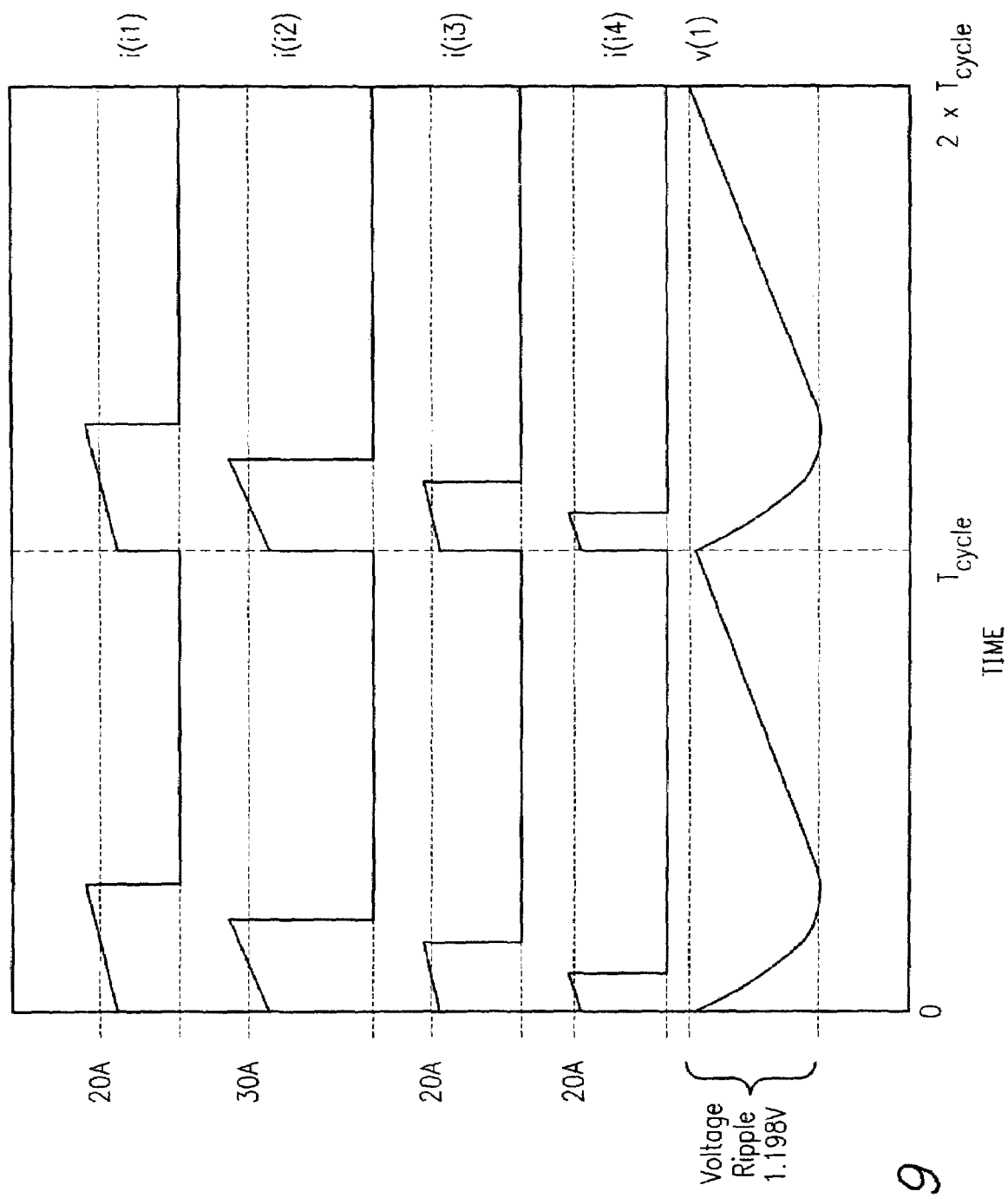
FIGS. 9-11 illustrate exemplary embodiments of the timing diagrams and input ripple of the POL regulator array.
Figure 10:
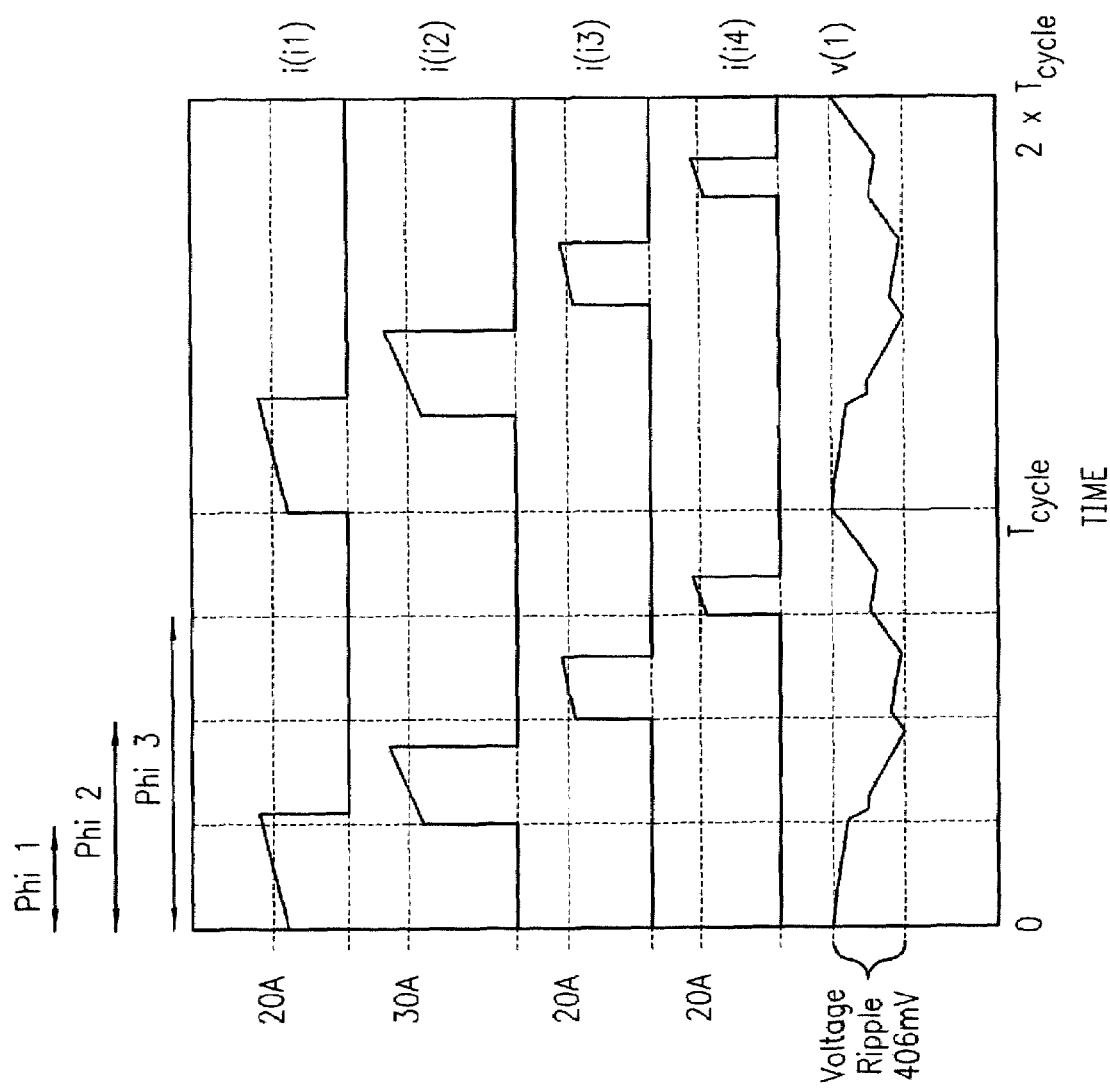
Figure 11:
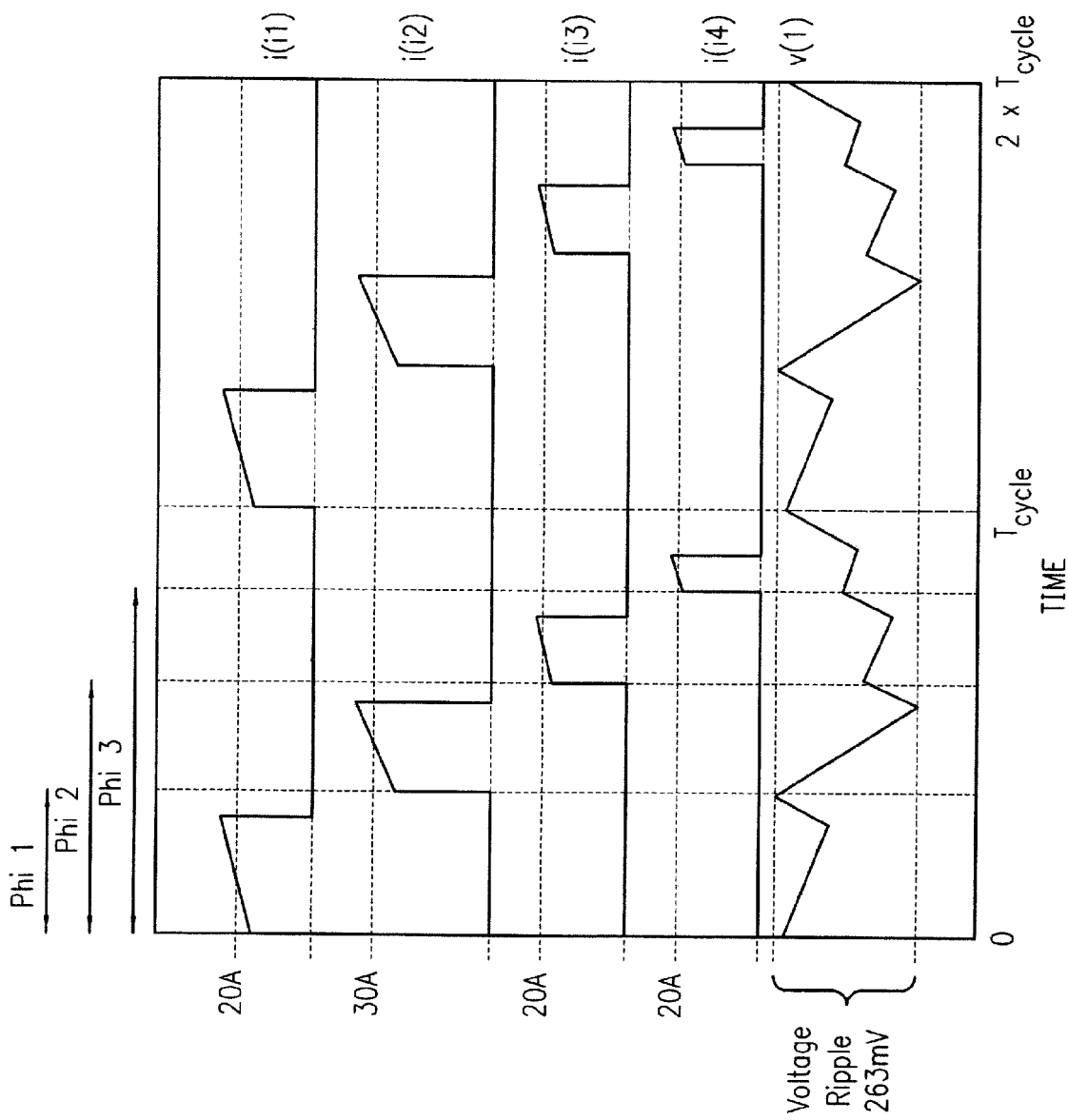

FIGS. 9-11 illustrate exemplary embodiments of timing diagrams and simplified input ripple waveforms. FIG. 9 shows an in-phase set of waveforms. In this exemplary embodiment, four downstream buck converter signals i(i1), i(i2), i(i3) and i(i4), which correspond to the input current of regulators with 3.3 V at 20 A, 2.5 V at 30 A, 1.8 V at 20 A and 1.2 V at 20 A, respectively, are shown. Signal i(co) is the ripple current in an input capacitor. As shown in FIG. 9, the resulting capacitor ripple voltage is 1.198 V. FIG. 10 illustrates the effects of out-phasing. In this case, the regulators are equally out-phased. It may be noted that the first two waveforms overlap. The resulting capacitor ripple voltage in this case is 406 mV. FIG. 11 shows an even more advantageous phasing distribution that results from choosing voltage and current dependant phase displacements. Accordingly, the capacitor ripple voltage is lower. In this case, the capacitor ripple is 263 mV. This shows clearly the advantage of being able to choose the phase displacement according the operating point of the system to reduce system noise. It may be understood that further optimization is possible. Thus, phase displacing these pulses may result in lowered capacitor ripple or, alternatively, lower amounts of bus capacitance may be required to support a given ripple voltage.

The invention is susceptible to various modifications and alternative forms, and specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the claims.

What is claimed is:

1. A method for interleaving a plurality of switched-mode voltage regulators, comprising the steps of:
   selecting a phase displacement for each voltage regulator;
   generating a synchronization signal;
   communicating the synchronization signal to the plurality of voltage regulators simultaneously;
   generating a trigger signal for at least one of the plurality of voltage regulators that is phase displaced from the synchronization signal by the selected phase displacement and synchronized to a selected frequency multiple of the synchronization signal;
   providing a phase-displaced switching frequency based on the trigger signal; and
   operating the at least one of the plurality of voltage regulators using the phase-displaced switching frequency.

2. The method of claim 1, further comprising assigning an address for each voltage regulator.

3. The method of claim 2, wherein the phase displacement for a selected voltage regulator is based on the address of the selected voltage regulator.

4. The method of claim 1, further comprising transmitting the phase displacement for the selected voltage regulator to the selected voltage regulator.

5. The method of claim 1, further comprising:
   receiving an input voltage via a common input bus; and
   providing a single multi-phase voltage output.

6. The method of claim 1, further comprising:
   receiving a plurality of input voltages; and
   providing a plurality of output voltages, wherein each output voltage is phase displaced with respect to each other.

7. The method of claim 1, further comprising:
   receiving a plurality of input voltages; and
   providing a single multi-phase voltage output.

* * * * *